United States Patent Office 2,829,037
Patented Apr. 1, 1958

2,829,037
DEFOLIATING COMPOSITION AND METHOD

Heinz Pohlemann, Ludwigshafen (Rhine), Hans Krzikalla, Heidelberg, and Oskar Flieg and Carl Pfaff, Limburgerhof, Pfalz, Germany, assignors to Badische Anilin- & Soda-Fabrik Aktiengesellschaft, Ludwigshafen (Rhine), Germany No Drawing. Application July 19, 1956
Serial No. 598,750

Claims priority, application Germany July 20, 1955

12 Claims. (Cl. 71—2.5)

This invention relates to a new defoliating composition and method for defoliating plants, shrubs and the like, especially agricultural plants. The invention finds important application in harvesting the crops of a number of useful plants, especially in harvesting cotton.

The harvesting of various plant crops is hindered by the presence of the plant foliage. Consequently, attempts have been made to defoliate the plants prior to harvesting the crops. For example, methods have been proposed for removing the plant leaves mechanically. However, such methods have not proven to be practical. Also, plant defoliation has been carried out by chemical agents, which have been applied to the leaves in the form of a dust or in admixture with a liquid diluent or carrier. The chemicals are applied prior to the harvest, and they produce premature withering of the leaves, which fall off rapidly without damaging the crop. 3-amino-1,2,4-triazole and 2-alkylmercaptobenzothiazoles have previously been used in this manner.

Defoliation is to be distinguished from herbicidal action. In the former case, only the leaves are affected by the chemical agent, causing them to wither and fall off. In the latter case, the plant is killed, and the leaves wither but remain on the plant, and the crop may be injured as well.

Defoliation has been found to be quite specific, and it is not possible to predict what compounds will be effective as defoliating agents from the knowledge of the activity possessed by the compounds known to be effective. Thus, it is known that the defoliating action is not due to a substituted mercapto group, or to the presence of a nitrogen or a sulfur atom forming part of a ring system. Many compounds which contain nitrogen and/or sulfur, which are cyclic or which contain substituted mercapto groups do not have this action. Consequently, inferences cannot be drawn regarding the structure which compounds must possess in order to produce defoliation.

It has now been found in accordance with the invention that 2,5-dimethylolmercapto-1,3,4-thiodiazole is a very advantageous chemical agent for the defoliation of useful or crop-bearing plants. The invention provides a novel composition of the foregoing compound and an agricultural carrier, which is applied to the plants for defoliation without injury to the fruit or crop, or to the plant stems and stalks. A new method is provided which involves contacting the plants with the compound.

The compound employed in the invention is very effective in removing the plant leaves prior to harvest, and it is also advantageous in that it is readily prepared in a simple manner from readily accessible and economical starting materials. For example, the compound can be prepared by reacting 2,5-dimercapto-1,3,4-thiodiazole with formaldehyde in alkaline solution (cf. E. Ziegler and N. Kreisel, Monatshefte für Chemie, vol. 81, p. 848). The 2,5-dimethylolmercapto-1,3,4-thiodiazole produced and employed as the active ingredient in a defoliating composition has the following structural formula:

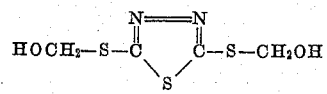

The active compound is preferably applied to the plants in admixture with an agricultural carrier or diluent, and it may be dispersed in physical mixture, in solution or in suspension. Either a solid or a liquid agricultural carrier may be employed. The preparation of the new composition and its application may be facilitated by the inclusion of a wetting agent, a dispersing agent, and/or an adherent.

Of the liquid carriers employed, it is preferred to use water and/or a mineral oil, such as kerosene, toluene, or diesel fuel, or other oily carrier such as formamide, dimethylformamide and glycol. Suitable solid carriers or diluents include talc, soapstone, chalk, pumice, bentonite and other known solid carriers for agricultural application. The carrier should be inert to the remainder of the plant, other than the leaves. The active compound is incorporated in intimate mixture with the carrier, preferably in a quantity amounting to within several percent of the weight of the total composition.

The compound has but limited solubility in water, so that it is preferred that aqueous compositions also contain a dispersing agent, such as lignin sulfonates and oxyethylated fatty alcohols. Likewise, emulsions of water and oil may be employed, preferably with the inclusion of an emulsifying agent, such as succinic acid ester sulfonates, alkyl or aryl sulfonates or polyethylene oxides. For suitable application to the plant leaves, it is preferred to include a wetting agent in the composition or to add it to the composition before applying same. As suitable wetting agents may serve the before-mentioned emulsifying agents.

The optimum level of application involves the use of concentrations of the active compound such that effective defoliation is obtained by the quantity of the composition which is retained on the leaves, or by the limit of capacity of the leaves for retention of the composition.

It is preferred to provide an amount ranging between about 0.1% and 1% by weight, in particular a quantity of about 0.25% to 0.75% of the active compound in the aqueous compositions to be applied to the plants, and a quantity of 2.5% to 10% of the active compound in oily compositions, these proportions ordinarily being sufficient to cause the plant leaves to fall off completely in a short period of time. Said aqueous compositions also preferably contain about 0.05% to 0.1% of a wetting agent. The dispersing agent should generally amount to about one third of the weight of active compound.

The 2,5-dimethylolmercapto-1,3,4-thiodiazole may also be applied to the plants in solid form, such as a powder or dust, and it is then preferred to admix the compound with a solid powder or dust diluent and an adherent to cause adhesion to the plants, such as cellulose glycolate, proteine salts, resins and waxes. The concentration of the active compound in the solid composition may be appropriately varied according to the characteristics of the composition. Thus, since the solid diluents have varying degrees of porosity and adsorption of the active compound, it may be desirable to include more or less of the compound. Generally, it is preferred that the proportion of the active compound be within about 10% by weight and preferably above about 1%.

The composition is sprayed or dusted on the plants in the usual manner for spraying and dusting crops. An amount of the active compound effective to cause defoliation is applied to the leaves of a plant having a crop at least nearing maturity. The composition may be applied to various crop-bearing plants, such as cotton and beans, e. g., soybeans. The rates of application may be, for example, about 50 gallons per acre of cotton for the ready made aqueous compositions, about 5 to 10 gallons for the oily compositions, and about 30 to 50 pounds per acre for the solid compositions. Application preferably precedes harvest by about two to three weeks, and the plants are completely defoliated within this period and prior to harvest. The remaining parts of the plant, such as the fruit or bolls, the stems and the stalks are not harmed, and the crop may be harvested without interference from and contamination by the leaves.

The following examples are provided as illustrative of the invention, but it will be understood that the invention is not limited thereto nor to the proportions, procedures and compositions given therein. Unless otherwise specified, the parts are by weight.

*Example 1*

Cotton plants are sprayed with a defoliating composition about three weeks before the harvest, when the cotton is to be picked. The composition is a dispersion of 0.5% by weight of 2,5-dimethylomercapto-1,3,4-thiodiazole in water, containing 0.2% by weight of oxyethylated sperm oil as a dispersing agent for the active compound. The composition also contains 0.05% of the sodium salt of sulfosuccinic acid dinonyl ester, as a wetting agent.

The aqueous dispersion is agitated before application and, optionally, may be agitated during the operation. The composition is sprayed over the plants at a rate of application of about 50 gallons per acre.

In about fourteen days from the time of spraying, the cotton plants are completely defoliated. The leaves wither prematurely and fall off the stems, so that the crop is exposed for harvesting. The bolls, the stems, and the stalks exhibit no damage. On the other hand, the leaves still adhere firmly to the stems of cotton plants which are not sprayed with the composition.

*Example 2*

Another composition suitable for spraying on plants and defoliating them in the same manner is as follows:

| Ingredients: | Parts by weight |
|---|---|
| 2,5-dimethylolmercapto-1,3,4-thiodiazole | 5 |
| Diesel fuel | 95 |

The foregoing composition is sprayed on cotton plants, for example, at a rate of application of about 10 gallons per acre.

*Example 3*

A solid composition useful for dusting on crop-bearing plants, such as cotton, is as follows:

| Ingredients: | Parts by weight |
|---|---|
| 2,5-dimethylolmercapto-1,3,4-thiodiazole | 10 |
| Bentonite | 90 |

The foregoing composition is dusted on cotton plants, for example, at a rate of application of about 50 pounds per acre.

The invention thus provides a new and very effective defoliating composition and method for defoliating plants, which provide very advantageous results. The invention is especially useful in harvesting cotton, where the leaves interfere substantially with harvesting and, especially in mechanical picking, provide a high content of trash in the cotton.

What we claim is:

1. A defoliating composition comprising an intimate mixture of 2,5-dimethylolmercapto-1,3,4-thiodiazole, a mineral oil, and a wetting agent, the concentration of said thiodiazole in said composition being effective to cause defoliation of plants when the composition is applied thereto.

2. A defoliating composition comprising an intimate mixture of about 2.5% to 10% by weight of 2,5-dimethylolmercapto-1,3,4-thiodiazole, and an oily agricultural carrier.

3. The method for defoliating plants which comprises contacting them with an amount of 2,5-dimethylolmercapto-1,3,4-thiodiazole effective to cause defoliation of the plants.

4. The method for defoliating a crop bearing plant which comprises applying to the leaves of a plant having a crop at least nearing maturity, an amount of 2,5-dimethylolmercapto-1,3,4-thiodiazole effective to cause defoliation of said plant.

5. The method for facilitating the harvesting of cotton which comprises contacting the plants with a composition of 2,5-dimethylolmercapto-1,3,4-thiodiazole and an agricultural carrier, about two to three weeks preceding harvesting, in an amount of said composition and in a concentration of said thiodiazole therein effective to cause defoliation of said plants.

6. The method for defoliating cotton plants which comprises applying to the leaves of the plants having a crop at least nearing maturity, an amount of 2,5-dimethylolmercapto-1,3,4-thiodiazole effective to cause defoliation of said plants.

7. The method for defoliating cotton plants which comprises applying to the leaves of the plants a composition containing about 0.1% to 1% by weight of 2,5-dimethylolmercapto-1,3,4-thiodiazole, and an aqueous carrier, in an amount of said composition effective to cause defoliation of said plants.

8. The method for defoliating cotton plants which comprises applying to the leaves of the plants a composition containing about 2.5% to 10% by weight of 2,5-dimethylolmercapto-1,3,4-thiodiazole, and an oily agricultural carrier, in an amount of said composition effective to cause defoliation of said plants.

9. The method for defoliating cotton plants which comprises applying to the leaves of the plants a composition containing about 1% to 10% by weight of 2,5-dimethylolmercapto-1,3,4-thiodiazole, and a solid agricultural carrier, in an amount of said composition effective to cause defoliation of said plants.

10. The method defined in claim 7 wherein said composition is applied in an amount of about 50 gallons per acre of cotton.

11. The method defined in claim 8 wherein said composition is applied in an amount of about 5 to 10 gallons per acre of cotton.

12. The method defined in claim 9 wherein said composition is applied in an amount of about 30 to 50 pounds per acre of cotton.

References Cited in the file of this patent

Ziegler et al. in "Chemical Abstracts," vol. 45, column 4239d (1951).